US006588214B2

(12) United States Patent
Mack et al.

(10) Patent No.: US 6,588,214 B2
(45) Date of Patent: Jul. 8, 2003

(54) WEAR REDUCTION MEANS FOR A GAS TURBINE COMBUSTOR TRANSITION DUCT END FRAME

(75) Inventors: Brian R. Mack, Palm City, FL (US); Richard W. Whiting, Palm Beach Gardens, FL (US)

(73) Assignee: Power Systems MFG, LLC, Jupiter, FL (US)

(*) Notice: Subject to any disclaimer, the term of this patent is extended or adjusted under 35 U.S.C. 154(b) by 0 days.

(21) Appl. No.: 09/973,110

(22) Filed: Oct. 9, 2001

(65) Prior Publication Data

US 2003/0066292 A1 Apr. 10, 2003

(51) Int. Cl.$^7$ .................................................. F02C 7/20
(52) U.S. Cl. ............................................ 60/798; 60/799
(58) Field of Search ....................... 60/800, 805, 39.37, 60/796, 798, 799; 415/135, 136, 138

(56) References Cited

U.S. PATENT DOCUMENTS 4,465,284 A * 8/1984 Szema ........................ 277/628
5,125,796 A * 6/1992 Cromer ................... 415/174.2
5,265,412 A * 11/1993 Bagepalli et al. ............. 60/800
5,400,586 A * 3/1995 Bagepalli et al. ............. 60/800
5,457,954 A * 10/1995 Boyd et al. ................... 60/800
5,749,218 A 5/1998 Cromer et al.
5,987,879 A * 11/1999 Ono ............................ 60/800
6,450,762 B1 * 9/2002 Munshi ...................... 415/138

* cited by examiner

*Primary Examiner*—Ehud Gartenberg
(74) *Attorney, Agent, or Firm*—Brian R. Mack; Christopher T. Hayes

(57) ABSTRACT

Interaction between mating gas turbine combustor components due to vibrations and assembly tolerances can cause excessive wear and premature replacement. Typically, wear reduction features, such as hardened materials, are used to minimize the amount of wear or direct such wear to a specific component. The present invention discloses an improved wear reduction device for the interface between a gas turbine combustor transition duct end frame and the turbine inlet. The improved wear reduction device incorporates "L-shaped" wear strip inserts, constructed of a hardened material, and fixed along the sidewalls of the end frame to protect it from wear by the mating turbine inlet seal. The improved wear strip insert provides a cost savings by not requiring costly manufacturing tooling to form the wear strip inserts, unlike previous wear reduction techniques for the same component interface.

7 Claims, 3 Drawing Sheets

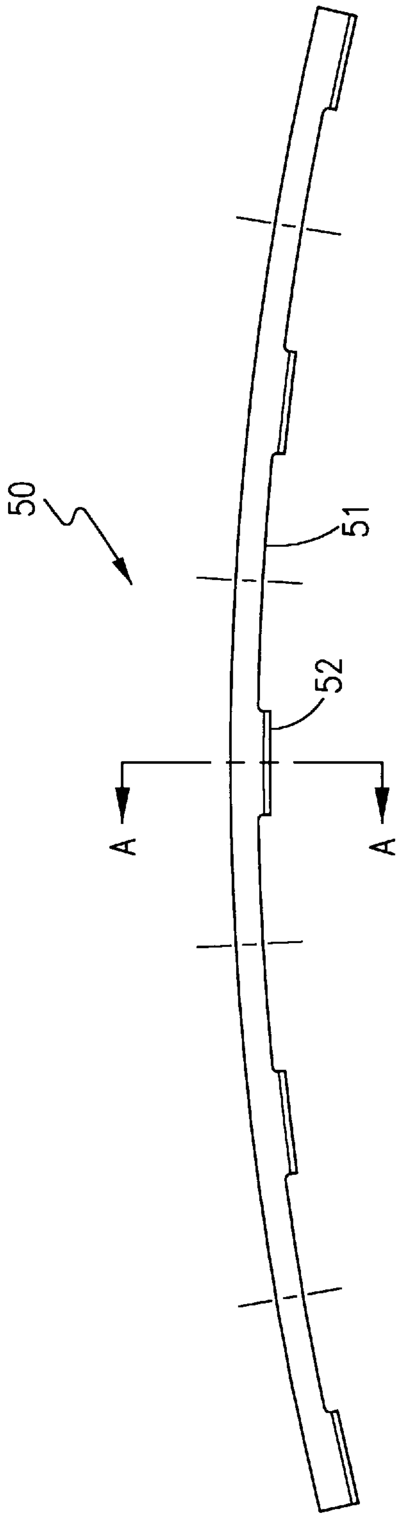
FIG. 3
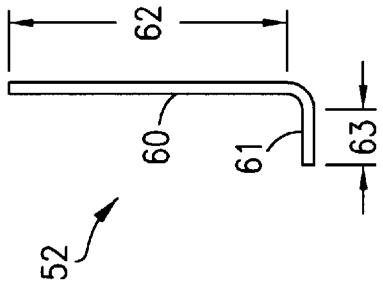
FIG. 4 - Section A-A

WEAR REDUCTION MEANS FOR A GAS TURBINE COMBUSTOR TRANSITION DUCT END FRAME

BACKGROUND OF THE INVENTION

1. Field of the Invention

This invention relates to industrial gas turbines in general and more specifically to an improved device for reducing the amount of wear that occurs along mating surfaces of a combustion transition duct end frame due to vibration and tolerance issues of the turbine inlet seal.

2. Description of Related Art

Typical industrial gas turbines include multiple combustors, arranged in an array about the engine. These combustors, also known as can-annular combustors, contain the chemical reaction that occurs between fuel and compressor discharge air. The hot gases produced are directed through a turbine that is coupled to a generator used to generate electricity. A typical combustor includes an outer case, a flow sleeve to regulate the amount of compressor discharge air that is introduced into the combustion chamber, and a combustion liner that contains the actual combustion chamber. Fixed to the outer case is a cover assembly that contains at least one fuel nozzle, which can inject liquid and/or gas fuel into the combustion liner. The fuel and compressor discharge air then mix within the combustion liner and react in the combustion chamber. The hot gases formed within each combustor are introduced into the turbine section through multiple transition ducts. The transition ducts are contoured in shape to mate to both the combustor on the forward end and the turbine on the aft end. Given the quantity of individual combustion components, there are a number of interfaces between these components where interaction occurs and depending on the component material and operating conditions significant wear between the mating components can cause premature replacement.

One such area in particular that can suffer from excessive wear is the aft end of the transition duct within the end frame. Wear within the aft end frame is due to its interaction with the floating seal, which connects the end frame to the turbine section. This interaction can be from vibrations or from excessive component tolerances. A means to reduce the effects of a mechanical interaction as described is to place a sacrificial wear strip in-between the contacting components. An example of the end frame of a transition duct incorporating a type of sacrificial wear strip is shown in FIG. 1. The end frame 23 contains a generally "U-shaped" channel 38, defined by two parallel sidewall members 24 that extend radially outward from the end frame. A typical seal between end frame 23 and turbine inlet 18 is a floating seal 40. This seal is flexible to allow for relative thermal expansion between the mating components. Under operating conditions this seal can contact the sidewalls 24 of end frame 23, causing damage to the sidewalls that requires costly repair work to the end frame region. An industry-known solution to prevent wear in this region is to place a "U-shaped" wear insert 42 into U-shaped channel 38, such that floating seal 40 will rub against the wear insert and not sidewalls 24. This wear insert configuration is described in detail in U.S. Pat. No. 5,749,218. Though the U-shaped wear insert has been effective it is not without its drawbacks.

The U-shaped channel 38 is approximately 0.200" wide and 0.700" deep, and requires an even smaller U-shaped wear insert to fit within channel 38. In order to manufacture this shape of wear insert, given the depth of channel 38, special tooling is required to form the wear insert into the U-shape cross section as well as the arc-shaped plane to match the profile of slot 38. Complicating matters of forming the wear insert is the thickness of the insert material. Given the small channel in which to install the insert and the thickness of floating seal 40, the wear insert material is extremely thin, approximately 0.018", and given its U-shaped cross section, the wear insert can waver along its arc length, thereby creating a non-uniform interface to secure the wear strip to the end frame sidewalls 24.

OBJECTS OF THE INVENTION

It is an object of the present invention to provide an improved wear strip insert for an end frame of a gas turbine transition duct.

It is a further object of the present invention to provide a more cost efficient means for producing a wear strip insert for an end frame of a gas turbine transition duct, by eliminating the need for special form tooling.

The present invention addresses the manufacturing and assembly issues previously mentioned by introducing a generally "L-shape" wear insert design that eliminates the need for special tooling to form the insert, thereby reducing manufacturing costs. The generally L-shape design is cut from a flat sheet by typical methods, such as wire EDM, laser, or water jet cutter, in an arc length equal to the circumferential length of the U-shaped channel sidewall that the wear strip insert is covering. Intermittent tabs in the flat sheet arc length are then bent over manually to form the short leg of the desired L-shape. The preferred embodiment of the present invention will be outlined in greater detail below.

In accordance with these and other objects, which will become apparent hereinafter, the instant invention will now be described with particular reference to the accompanying drawings.

BRIEF DESCRIPTION OF DRAWINGS

FIG. 3 is a plane view of the L-shaped seal.

FIG. 4 is a cross section view of the L-shaped seal from FIG. 3.

DETAILED DESCRIPTION OF THE PREFERRED EMBODIMENT

Figure 1:
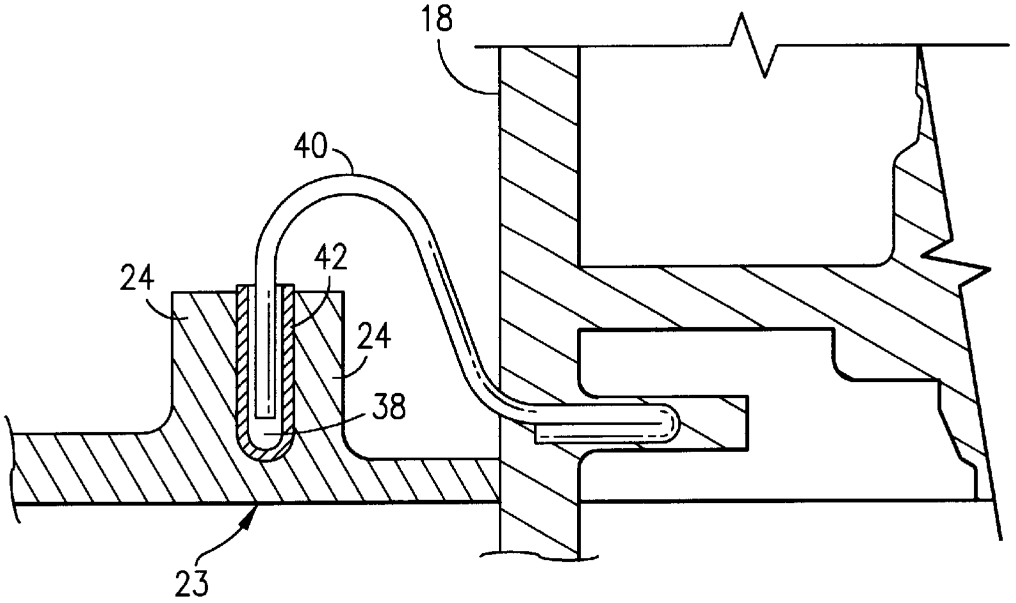
FIG. 1 PRIOR ART
FIG. 1 is a partial view cross-section of the prior art gas turbine transition duct end frame to turbine inlet.
Figure 2:
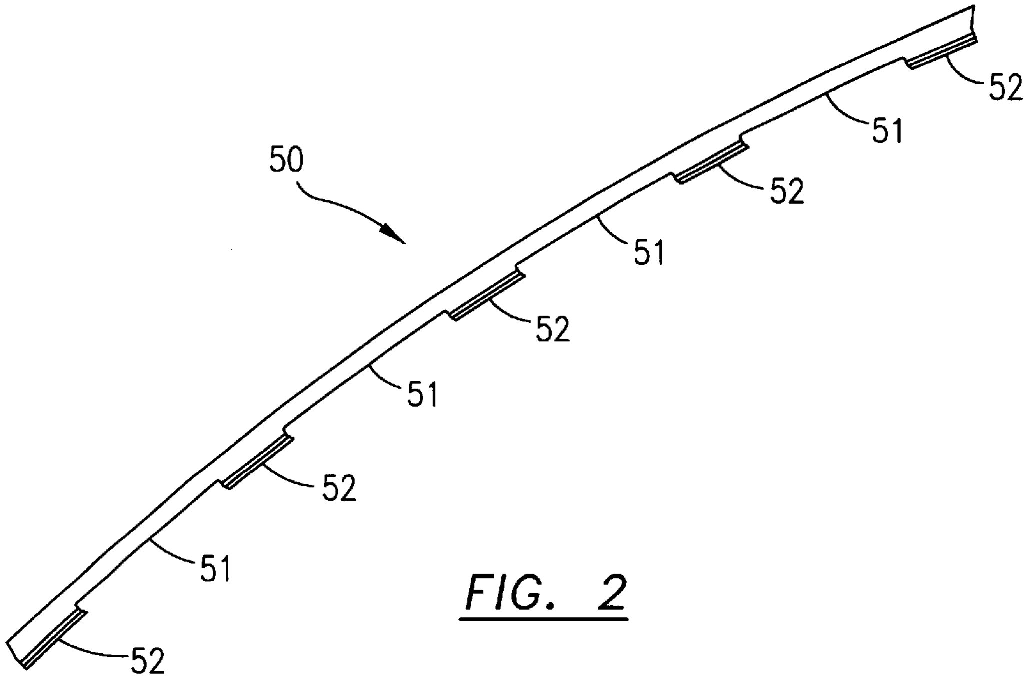
FIG. 2 is an isometric view of the L-shaped seal of the present invention.

The preferred embodiment is shown in FIG. 2, with wear strip insert 50 formed with generally L-shaped cross-sections and intermittent interrupted sections 51. The L-shaped sections 52 contain the short leg portions for securing the wear strip insert to the transition duct end frame U-shaped slot sidewalls 24, as will be discussed below.

Figure 5:
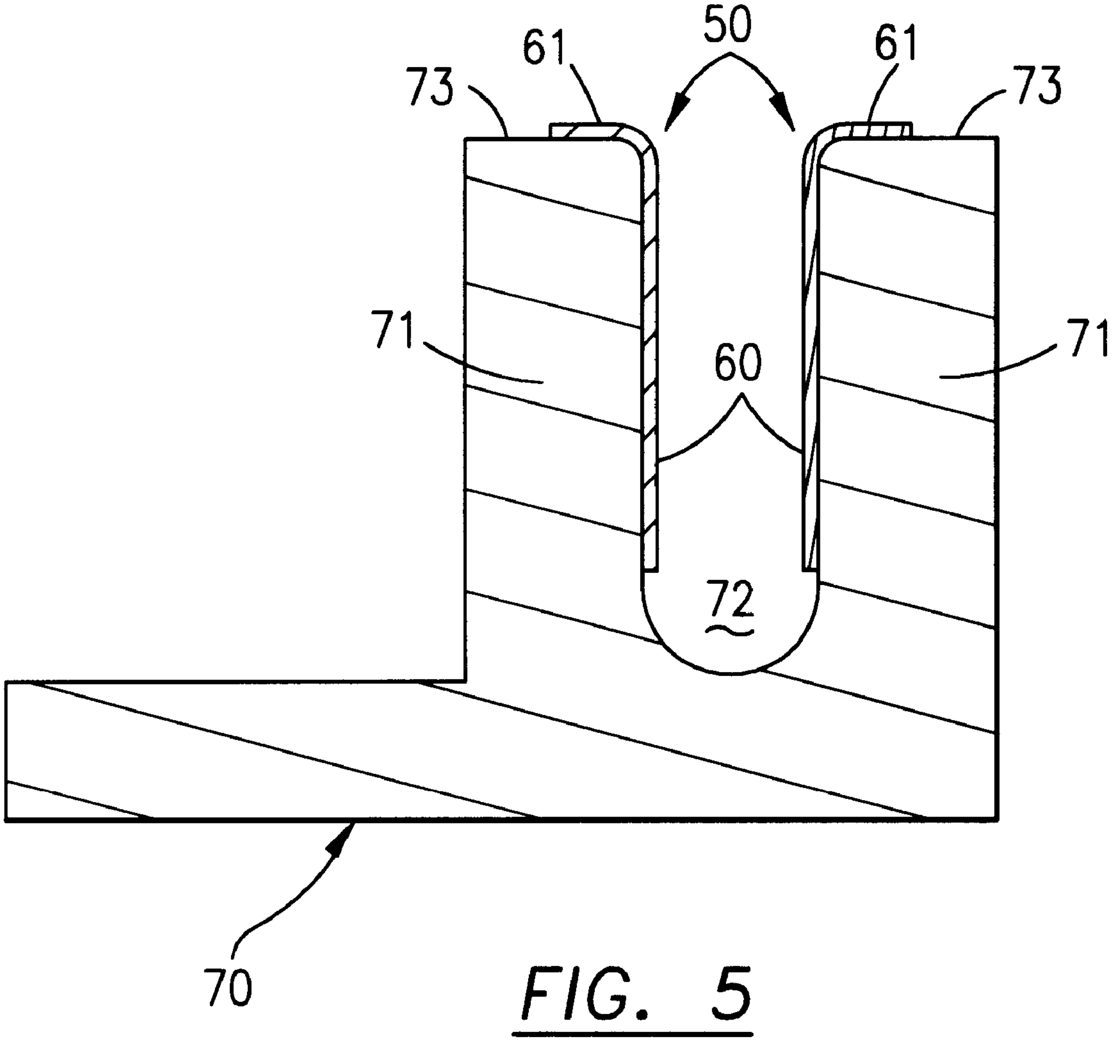
FIG. 5 is a partial view in cross section of the present invention installed on a transition duct end frame.

FIG. 3 shows a plane view of wear strip insert 50. In this view it can be seen that the wear strip insert is generally arc shaped in plane. A section cut, A—A, is taken through an L-shaped section 52 and shown in FIG. 4. Each of the wear inserts 50, along L-shaped sections 52 comprise two leg portions, a long leg portion 60 and a short leg portion 61. Long leg portion 60 extends a first distance 62 away from short leg portion 61 while short leg portion 61, which is generally perpendicular to long leg portion 60, extends a second distance 63 away from long leg portion 60. First distance 62 is greater than second distance 63. The short leg portion 61 is formed by bending a section of material that was previously parallel to long leg portion 60 to a position perpendicular to long leg portion 60. Along the previously discussed interrupted sections 51, only the long leg portion 60 is present. The preferred embodiment of the generally L-shaped wear strip insert is installed on the transition duct end frame and shown in cross section in FIG. 5.

Transition duct end frame 70 is shown in partial cross-section and includes a pair of radially outward extending, and parallel sidewalls 71 that form a generally U-shaped slot 72 about the periphery of end frame 70. For simplicity, only a section of one such slot is shown. Fixed to end frame sidewalls 71 via a typical method such as welding, are two generally L-shaped wear inserts 50. The section view shown is taken through the L-shaped section 52 similar to that of FIG. 3. At this section, each of the inserts includes a long leg portion 60 and a short leg portion 61. Short leg portions 61 are fixed to the radially outer most edge of sidewalls 71, along surfaces 73, while the long leg portions 60 are located proximate end frame sidewalls 71, within U-shaped slot 72.

To form the preferred embodiment, a flat sheet of a wear resistant alloy, such as L-605, is cut into arc-shaped strips with intermittent cutbacks made to form tabs that will be used to create the L-shape. Depending on which side of the end frame the wear strip will be mounted, either the inner or outer radius of the arc will have the intermittent cutbacks, and hence, the tabs. This cutting operation is accomplished by a conventional method such as wire EDM, laser, or waterjet cutter. These tabs are then bent over manually to form short leg portions 61 while the arc length section forms long leg portion 60. Cutting the wear strip insert from a flat pattern shape and making the short leg portions 61 intermittent allows for the wear strip insert to be formed without costly tooling while maintaining the benefit of wear reduction to the transition duct end frame, as seen in the prior art.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What we claim is:

1. A wear reduction device for a gas turbine engine combustor transition piece end frame having a plurality of radially outward extending U-shaped slots about the periphery of said end frame, each of said slots including a pair of substantially parallel sidewalls; and, at least four generally L-shaped wear strip inserts, each of said inserts includes a first leg portion and a second leg portion, said first leg portion is integral with said second leg portion and substantially perpendicular thereto, wherein said first leg portion of each of said inserts is received within one of said U-shaped slots proximate one of said sidewalls of said slot such that said first leg portion is parallel to said sidewall and said second leg portion is fixed to said end frame;

wherein said first leg portion extends away from said second leg portion a first distance, the second leg portion extends away from said first leg portion a second distance, and the first distance is greater than the second distance.

2. The wear reduction device of claim 1 wherein the shape each of said inserts is an "L" in cross-section said second leg portion is interrupted intermittently, and said first leg portion is uninterrupted.

3. The wear reduction device of claim 1 wherein each of said inserts is cut from sheet metal in a flat pattern shape and subsequently formed into an L-shape, and said first leg portion of each insert is generally arc-shaped in a plane generally perpendicular to said second leg portion.

4. The wear reduction device of claim 1 wherein each of said inserts is manufactured from a commonly known wear resistant alloy such as L-605 or Haynes 25.

5. The wear reduction device of claim 4 wherein said first leg portion extends away from said second leg portion a first distance, the second leg portion extends away from said first leg portion a second distance, and the first distance is greater than the second distance.

6. The wear reduction device of claim 4 wherein the shape each of said inserts is an "L" in cross-section said second leg portion is interrupted intermittently, and said first leg portion is uninterrupted.

7. The wear reduction device of claim 4 wherein each of said inserts is cut from sheet metal in a flat pattern shape and subsequently formed into an L-shape, and said first leg portion of each insert is generally arc-shaped in a plane generally perpendicular to said second leg portion.

* * * * *